H. HEYNAU.
CUTTING DISK FOR METAL CUTTING MACHINES.
APPLICATION FILED JUNE 3, 1913.

1,123,532.

Patented Jan. 5, 1915.

UNITED STATES PATENT OFFICE.

HANS HEYNAU, OF NUREMBERG, GERMANY.

CUTTING-DISK FOR METAL-CUTTING MACHINES.

1,123,532.  Specification of Letters Patent.  Patented Jan. 5, 1915.

Application filed June 3, 1913.  Serial No. 771,455.

*To all whom it may concern:*

Be it known that I, HANS HEYNAU, of Nuremberg, Bavaria, Germany, have invented an Improvement in or Relating to Cutting Disks for Metal-Cutting Machines, of which the following description, in connection with the accompanying drawing, is a specification.

This invention relates to a cutting disk for machines for dividing metal, with a groove provided in the rim of the disk. Cutting disks without such a groove are well known. They are used for separating or dividing metal and are brought with a very great circumferential speed against the work. Owing to the friction thus produced, so much heat is generated that the material at the point of contact or cutting, becomes incandescent and is partly burnt, and partly displaced to the side by the advancing metal disk. The result of the arrangement of a groove in such cutting disks is, as proved by experiments, that no perceptible quantity of bur can be any longer formed at the cutting point, while when disks without grooves were used, such bur was produced and exercised a disturbing effect.

Several constructions according to this invention are illustrated in the accompanying drawing.

Figure 1:
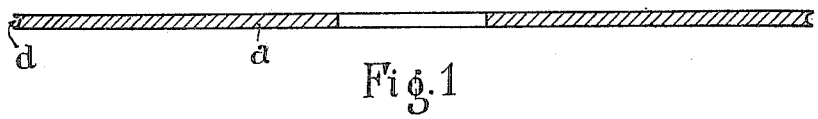
Figure 2:
Figure 3:
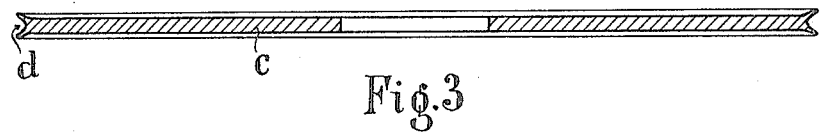
Figure 4:
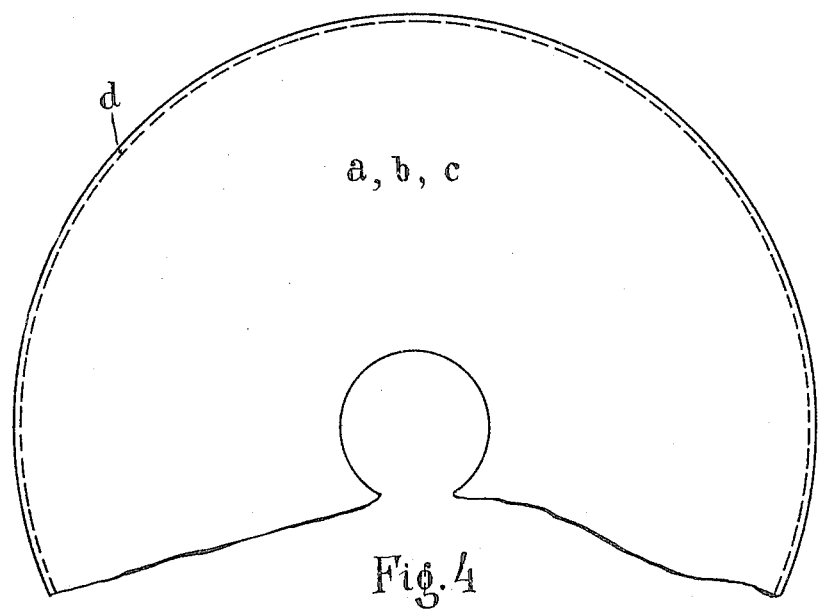

Figure 1 shows in cross-section a cutting disk *a* provided with a groove at the edge, the groove having an arc-shaped cross-section. Fig. 2 shows a disk *b* in which the groove is angular in cross-section. Fig. 3 shows a cutting disk *c* which is thickened or widened at the edge (see U. S. Patent No. 1039738) and moreover provided with a groove according to this invention. Fig. 4 shows in elevation a portion of the disk corresponding to the disks shown in Figs. 1–3.

The groove *d* arranged in the rim of the cutting disks, extends throughout the whole circumference and can be of any desired cross-section. Owing to the arrangement of the groove, the edges of the disk slightly project so that they first cut the work to be divided, and are always a little deeper in the work than the central portion of the edge of the disk contained between the two edges. Owing to this arrangement, the injurious formation of bur in cutting or separating the work, is completely avoided, and a very smooth cut is insured.

Having now particularly described and ascertained the nature of my said invention and in what manner the same is to be performed, I declare that what I claim is:

1. A high speed cutting disk for metal, comprising a disk provided with a groove, of any desired cross-section, on a rim thereof.

2. A high speed cutting disk for metal, comprising a disk, with a thickened edge and having a circumferential groove, of any desired cross-section, on the rim thereof.

3. A high speed cutting disk for metal, comprising a disk provided with a thickened edge and having a circumferential groove of any desired cross-section on the rim thereof.

4. A high speed cutting disk for metal, comprising a disk provided with a circumferential groove of angular cross-section on the rim thereof.

In testimony whereof I affix my signature in presence of two witnesses.

HANS HEYNAU.

Witnesses:
 GEORG GEITNER,
 OSCAR BOCK.

Copies of this patent may be obtained for five cents each, by addressing the "Commissioner of Patents, Washington, D. C."